(12) United States Patent  
Harris

(10) Patent No.: US 7,042,208 B1
(45) Date of Patent: May 9, 2006

(54) VOLTAGE ISOLATION BUFFER WITH AC COUPLED AND DC COUPLED HALL EFFECT MAGNETIC FIELD SENSORS

(76) Inventor: Larry L. Harris, 4405 Knob Oak La., Austin, TX (US) 78725

( * ) Notice: Subject to any disclaimer, the term of this patent is extended or adjusted under 35 U.S.C. 154(b) by 55 days.

(21) Appl. No.: 11/074,353

(22) Filed: Mar. 7, 2005

Related U.S. Application Data

(62) Division of application No. 10/076,951, filed on Feb. 15, 2002, now Pat. No. 6,879,145.

(51) Int. Cl.
*G01R 31/00* (2006.01)

(52) U.S. Cl. .................................. 324/158.1

(58) Field of Classification Search ............ 324/158.1, 324/117 R–117 H, 126–127, 250–252
See application file for complete search history.

(56) References Cited

U.S. PATENT DOCUMENTS

| | | | |
|---|---|---|---|
| 4,020,294 A | 4/1977 | Kitajewski et al. | |
| 4,395,677 A | 7/1983 | Petersdorf | |
| 4,441,072 A | 4/1984 | Rahman | |
| 4,514,685 A | 4/1985 | Gilker | |
| 4,616,188 A | 10/1986 | Stitt et al. | |
| 4,760,285 A | 7/1988 | Nelson | |
| 4,801,833 A | 1/1989 | Dye | |
| 4,833,406 A | 5/1989 | Foster | |
| 4,982,155 A * | 1/1991 | Ramsden .................. 324/207.2 |
| 5,055,768 A | 10/1991 | Plagens | |
| 5,291,607 A | 3/1994 | Ristic et al. | |
| 5,604,433 A | 2/1997 | Theus et al. | |
| 5,621,319 A | 4/1997 | Bilotti et al. | |
| 5,627,398 A | 5/1997 | Zlebir et al. | |
| 5,811,965 A | 9/1998 | Gu | |

(Continued)

OTHER PUBLICATIONS

Micronas Data Sheet: "HAL114, HAL115, Hall Effect Sensor Family", Dec. 20, 1999, 2nd Release. [online], [retrieved on or about Feb. 8, 2002] Retrieved from the Internet <URL:http://www.micronas.com/products/documentation/sensors/>.

(Continued)

*Primary Examiner*—Vinh P. Nguyen
(74) *Attorney, Agent, or Firm*—H. Lisa Calico; Wong, Cabello, Lutsch, Rutherford & Brucculeri, L.L.P.

(57) ABSTRACT

A voltage isolation buffer, including a pilot channel having a first Hall effect element and a data channel having a second Hall effect element is disclosed. The pilot channel is preferably AC coupled, and the data channel is preferably DC coupled. The voltage isolation buffer may include a calibration engine, which may be configurable to calibrate the voltage generated by the second Hall effect element based on the information from the first Hall effect element. A bi-directional voltage isolation buffer is also disclosed, including a first integrated circuit and a second integrated circuit. The first integrated circuit includes a DC coupled Hall effect sensor and an AC coupled Hall effect sensor. The second integrated circuit includes an AC coupled Hall effect sensor and a DC coupled Hall effect sensor. A method for transmitting data across a voltage isolation barrier is also disclosed including the steps of generating a first hall voltage signal, AC coupling the first Hall voltage signal, generating a second Hall voltage signal, DC coupling the second Hall voltage signal, and calibrating the second Hall voltage signal, wherein the step of calibrating is controlled by the first Hall voltage signal.

11 Claims, 7 Drawing Sheets

U.S. PATENT DOCUMENTS 5,834,973 A   11/1998   Klatser et al.
6,225,927 B1   5/2001   Scott et al.

OTHER PUBLICATIONS

Micronas Data Sheet: "HAL11x, HAL5xx, HAL62x Data Sheet Supplement", Jul. 4, 2000, 1st Release, [online], [retrieved on or about Feb. 8, 2002] Retrieved from the Internet <URL:http://www.micronas.com/products/documentation/sensors/>.

Micronas Data Sheet: "HAL300, Differential Hall Effect Sensor IC", Jul. 15, 1998, 1st Release. [online], [retrieved on or about Feb. 8, 2002] Retrieved from the internet <URL:http://www.micronas.com/products/documentation/sensors/>.

Micronas Data Sheet: "HAL320, Differentlal Hall Effect Sensor IC", Jul. 15, 1998, 1st Release. [online], [retrieved on or about Feb. 8, 2002] Retrieved from the Internet <URL:http://www.micronas.com/products/documentation/sensors/>.

Micronas Data Sheet: "HAL300, HAL320 Data Sheet Supplement" Jul. 4, 2000, 1st Release. [online], [retrieved on or about Feb. 8, 2002] Retrieved from the Internet <URL:http://www.micronas.com/products/documentation/sensors/>.

Micronas Data Sheet: "HAL525, HAL535 Hall Effect Sensor IC", Aug. 30, 2000. 3rd Release. [online], [retrieved on or about Feb. 8, 2002] Retrieved from the Internet <URL:http://www.micronas.com/products/documentation/sensors/>.

Micronas Data Sheet: "HAL556. HAL560. HAL566, Two-Wire Hall Effect Sensor Family", Aug. 3, 2000, 2nd Release. [online]. [retrieved on or about Feb. 8, 2002] Retrieved from the Internet <URL:http://www.micronas.com/products/documentation/sensors/>.

Micronas Advanced Information: "HAL571, 573 . . . 575, HAL581, 584, Two-Wire Hall Effect Sensor Family", Oct. 11, 2000, 1st Release. [online]. [retrieved on or about Feb. 8, 2002] Retrieved from the Internet <URL:http://www.micronas.com/products/documentation/sensors/>.

Micronas Data Sheet: "HAL621. HAL629, Hall Effect Sensor Family", Feb. 5, 2001, 2nd Release. [online], [retrieved on or about Feb. 8, 2002] Retrieved from the Internet <URL:http://www.micronas.com/products/documentation/sensors/>.

Micronas Preliminary Data Sheet: "HAL800 Programmable Linear Hall Effect Sensor", Oct. 20, 1999, 1st Release. [online], [retrieved on or about Feb. 8, 2002] Retrieved from the Internet <URL:http://www.micronas.com/products/documentation/sensors/>.

Micronas Preliminary Data Sheet: "HAL805 Programmable Linear Hall Effect Sensor", Feb. 2, 2000, 1st Release. [online], [retrieved on or about Feb. 8, 2002] Retrieved from the Internet <URL:http://www.micronas.com/products/documentation/sensors/>.

Micronas Advance Information: "HAL815 Programmable Linear Hall Effect Sensor", Nov. 10, 2000, 1st Release. [online], [retrieved on or about Feb. 8, 2002] Retrieved from the Internet <URL:http://www.micronas.com/products/documentation/sensors/>.

Micronas Advance Information: "HAL1000 Programmable Hall Switch", May 31, 2000, 1st Release. [online], [retrieved on or about Feb. 8, 2002] Retrieved from the Internet <URL:http://www.micronas.com/products/documentation/sensors/>.

Maupin, J. T., Geskes, M.L. "The Hall Effect in Silicon Circuits" in: Symposiuim on Hall Effect and Its Applications (New York, Plenum Press, 1979), pp. 421-445.

Micronas Product Overview: "Hall Effect Sensors-Sensors Overview and Systems Solutions", [online], [retrieved on or about Dec. 27, 2001] Retrieved from the Internet <URL:http://www.micronas.com/products/documentation/sensors/>.

* cited by examiner

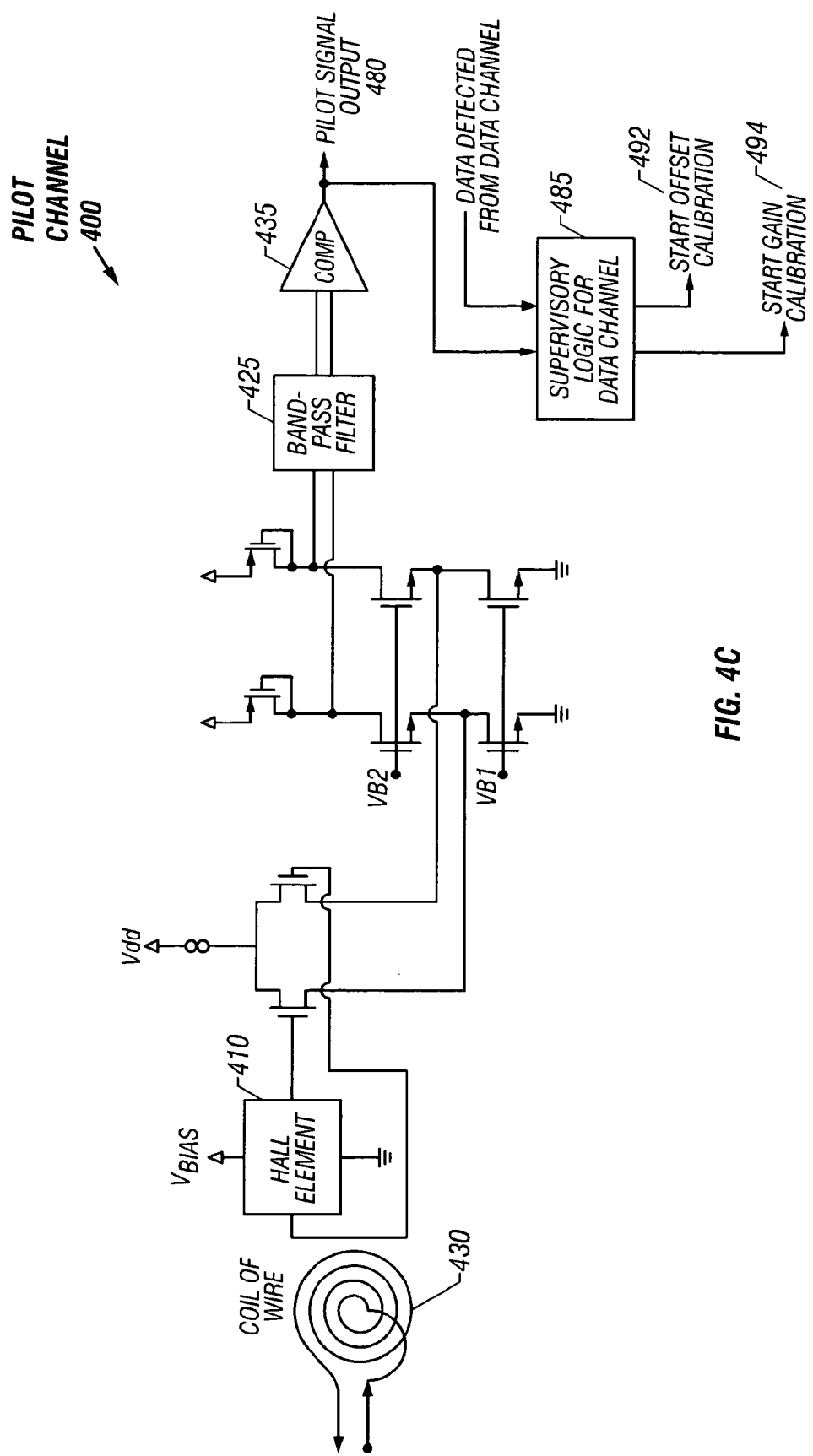

VOLTAGE ISOLATION BUFFER WITH AC COUPLED AND DC COUPLED HALL EFFECT MAGNETIC FIELD SENSORS

CROSS-REFERENCE TO RELATED APPLICATIONS

This application is a divisional application of U.S. application Ser. No. 10/076,951 filed on Feb. 15, 2002 U.S. Pat. No. 6,879,145. The benefit of 35 U.S.C. § 120 is hereby claimed for the above-referenced application. The contents of application Ser. No. 10/076,951 are hereby incorporated by reference.

BACKGROUND OF THE INVENTION

1. Field of the Invention

The present invention relates to voltage isolation barriers, and in particular, to solid-state voltage isolation buffers which allow information to be transmitted across the voltage isolation barrier via a magnetic field.

2. Description of Related Art

Many electronic systems, such as industrial control systems, require some form of electrical isolation in order to protect circuits from large voltage spikes. A benefit to electrical isolation is the avoidance of ground loops that significantly increase system noise. Other benefits are related to protecting people from electrical shock hazards.

Electrical isolation buffers relate to the transfer of information between electrical systems. When dissimilar electrical systems are linked by electrical isolation buffers, the electrical isolation buffers serve to translate information from one electrical system to the other electrical system.

Various electrical isolation technologies have been used in the past to translate information from one electrical system to another electrical system. For example, some electrical isolation technologies transmit AC coupled signals through capacitors or transformers. Optical coupled technologies convert electrical signals to optical signals transmit the optical signal to an optical receiver, which then converts the optical signal back to an electrical signal.

Other electrical isolation technologies use magnetic field sensors to measure the magnetic field generated by a signal current flowing in a coil of wire. For example, U.S. Pat. Nos. 4,020,294, 4,441,072, and 4,616,188 describe various Hall effect voltage isolation circuits that measure the magnetic field generated by signal current flowing in a coil of wire. However, these patents fail to address the problem that, in general, the performance of silicon based Hall effect sensors suffers due to large variations in magnetic field sensitivities and variations in DC-offset due to temperature changes. Additional information regarding the Hall effect in silicon circuits may be found in the article by J. T. Maupin and M. L. Geske entitled "The Hall Effect in Silicon Circuits." *Symposium on Hall Effect and Its Applications*, Johns Hopkins University, 1979, Plenum Press, New York, the contents of which are specifically incorporated herein by reference.

Various attempts have been made to correct for temperature changes in Hall effect sensors. For example, U.S. Pat. Nos. 4,833,406 and 5,055,768 describe various techniques to achieve fairly constant magnetic field sensitivity over a range of temperatures. U.S. Pat. No. 5,621,319 describes a technique to reduce the DC-offset of a Hall effect sensor. However, to achieve an optimal performing voltage isolation buffer utilizing a Hall effect sensor as the magnetic field sensor, it is desirable that both DC-offset variations and magnetic field sensitivity variations be greatly reduced.

The patents and references cited herein are specifically incorporated by reference to the maximum extent allowable by law.

SUMMARY OF THE INVENTION

A need has therefore arisen for an isolation buffer that overcomes the limitations of the prior art. In order to overcome the limitations of the prior art relating to temperature dependent sensitivity of Hall effect sensors, the present invention provides an AC coupled Hall effect sensor in combination with a DC coupled Hall effect sensor.

Accordingly, the present invention provides for a voltage isolation buffer comprising a pilot channel having a first Hall effect element and a data channel having a second Hall effect element, wherein the pilot channel is operatively coupled to the data channel. The pilot channel may be AC coupled, and the data channel may be DC coupled. The voltage isolation buffer may further comprise a means for calibration operatively coupled to the second Hall effect element or to the first Hall effect element or to both. The means for calibration may be configurable to calibrate the voltage generated by the second Hall effect element based on the information from the first Hall effect element. The pilot channel may further comprise a first comparator operatively coupled to the means for calibration. The pilot channel may further comprise a band-pass filter operatively coupled to the first comparator. The pilot channel may further comprise an amplifier operatively coupled to the band-pass filter. The data channel may further comprise a second comparator operatively coupled to the means for calibration. The Hall effect elements may composed of semiconductive material such as silicon.

In accordance with another embodiment, the present invention provides for a voltage isolation buffer comprising an AC coupled Hall effect sensor, a plurality of DC coupled Hall effect sensors and a means for calibration, wherein the AC coupled Hall effect sensor is operatively coupled to the means for calibration, and wherein each DC coupled Hall effect sensor is operatively coupled to the means for calibration.

The present invention also provides for a system for transmitting data across a voltage isolation barrier via a magnetic field, comprising a first pilot channel comprising an AC coupled Hall effect sensor and a plurality of data channels. Each data channel comprises a DC coupled Hall effect sensor and a means for calibration operatively coupled to the AC coupled Hall effect sensor. The means for calibration is configurable to receive information from the AC coupled Hall effect sensor and calibrate each DC coupled Hall effect sensor based on the information from the AC coupled Hall effect sensor.

The present invention also provides for a bi-directional voltage isolation buffer comprising a first integrated circuit and a second integrated circuit adjacent to the first integrated circuit. The first integrated circuit may comprise a DC coupled Hall effect sensor and an AC coupled Hall effect sensor. The first integrated circuit may also comprise a means for calibration operatively coupled to the AC coupled Hall effect sensor and to the DC coupled Hall effect sensor. The second integrated circuit comprises an AC coupled Hall effect sensor and a DC coupled Hall effect sensor. The second integrated circuit may also comprise a means for calibration operatively coupled to the AC coupled Hall effect sensor and to the DC coupled Hall effect sensor. Each integrated circuit may further comprise additional DC coupled Hall effect sensors.

A method for transmitting data across a voltage isolation barrier is also disclosed comprising the steps of generating a first Hall voltage signal, AC coupling the first Hall voltage signal, generating a second Hall voltage signal, DC coupling the second Hall voltage signal, and calibrating the second Hall voltage signal, wherein the step of calibrating is controlled by the first Hall voltage signal.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

FIG. 4C is a schematic diagram of the pilot channel of FIG. 4A.

DETAILED DESCRIPTION OF THE INVENTION

The following invention addresses the shortcomings of the prior art associated with the temperature related effects of a Hall effect voltage isolation barrier. In particular, a variation in the magnetic field signal is sensed with a Hall effect magnetic field sensor which produces an electrical signal proportional to the magnetic field.

Figure 1:
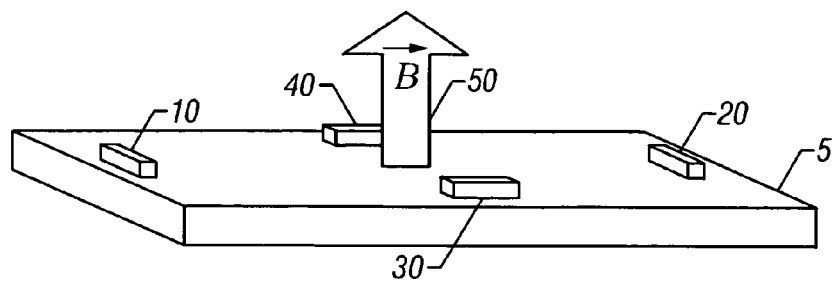
FIG. 1 is a block diagram of a Hall element in the prior art.

FIG. 1 depicts a block diagram of a prior art Hall effect element 5. Hall effect element 5 includes power supply terminals 10 and 20 and signal terminals 30 and 40. A bias voltage is applied across power supply terminals 10 and 20. The voltage difference across signal terminals 30 and 40 is given from the following:

$$V_H = V_S \cdot \mu \cdot B \cdot (k \cdot (w/l)) + V_{offset}; \qquad \text{Eq. 1}$$

and is proportional to the magnetic field 50 that is perpendicular to the top surface of Hall effect element 5. With respect to Equation 1, $V_H$ is the voltage across signal terminals 30 and 40, $V_S$ is the voltage across power terminals 10 and 20, $\mu$ is the mobility of the semiconductor material, B is the magnetic field, w is the width of Hall effect element 5, l is the length of Hall effect element 5, k is a correction factor, and $V_{offset}$ is the offset voltage of Hall effect element 5.

In an n-well, CMOS process, Hall effect element 5 is typically a four terminal n-well resistor. For a p-well, CMOS process, Hall effect element 5 is typically a four terminal p-well resistor.

Returning to Equation 1, the magnetic sensitivity in Hall effect element 5 is a function of mobility. Therefore, in an n-well process, the n-well is chosen for the four terminal resistor because of the relatively high mobility of the n-well. Likewise, in a p-well process, the p-well is chosen for the four terminal resistor.

In some embodiments based on a CMOS process, a high-resistivity, poly-silicon resistor is another high mobility material which may be used for a Hall effect sensor. However, the high resistivity, poly-silicon resistor is not readily available in a standard digital CMOS process. In addition, the translation of information using high resistivity, poly-silicon resistors may suffer from excess electrical noise due to the electron trap sites associated with the grain boundaries of the poly-silicon.

For silicon based Hall effect sensors, the magnetic field sensitivity at room temperature is approximately 2 millivolts per 100 Gauss. Since the signal generated by the Hall effect sensor is relatively small, the signal is typically amplified and filtered.

Figure 2:
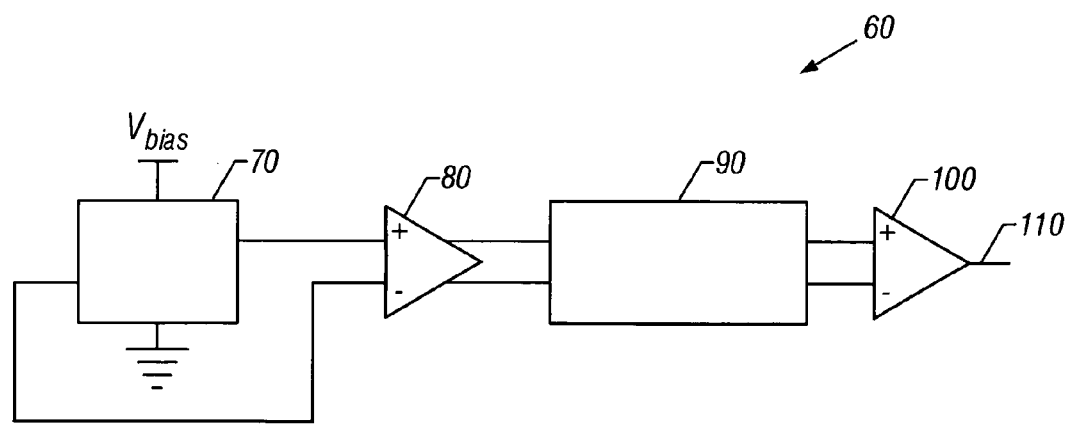
FIG. 2 is a block diagram of a prior art system for amplifying and filtering a signal from a Hall effect sensor.

FIG. 2 depicts a block diagram of a prior art system 60 for filtering and amplifying a signal generated by a Hall effect sensor. As shown in FIG. 2, a Hall effect element 70 is coupled to an amplifier 80, which is coupled to a filter 90. Filter 90 may comprise circuitry for filtering and other signal conditioning. In embodiments in which filter 90 is a low-pass filter, the Hall voltage generated by Hall effect element 70 is typically DC coupled. If filter 90 is a band-pass or a high-pass filter, then the Hall voltage is typically AC coupled. As will be apparent to those skilled in the art, DC coupling allows both DC and AC signals through, while AC coupling rejects DC components and allows only AC signals. The filtered signal is then transmitted to comparator 100, which converts the analog signal to a digital signal and yields the digital output signal 110.

Figure 3:
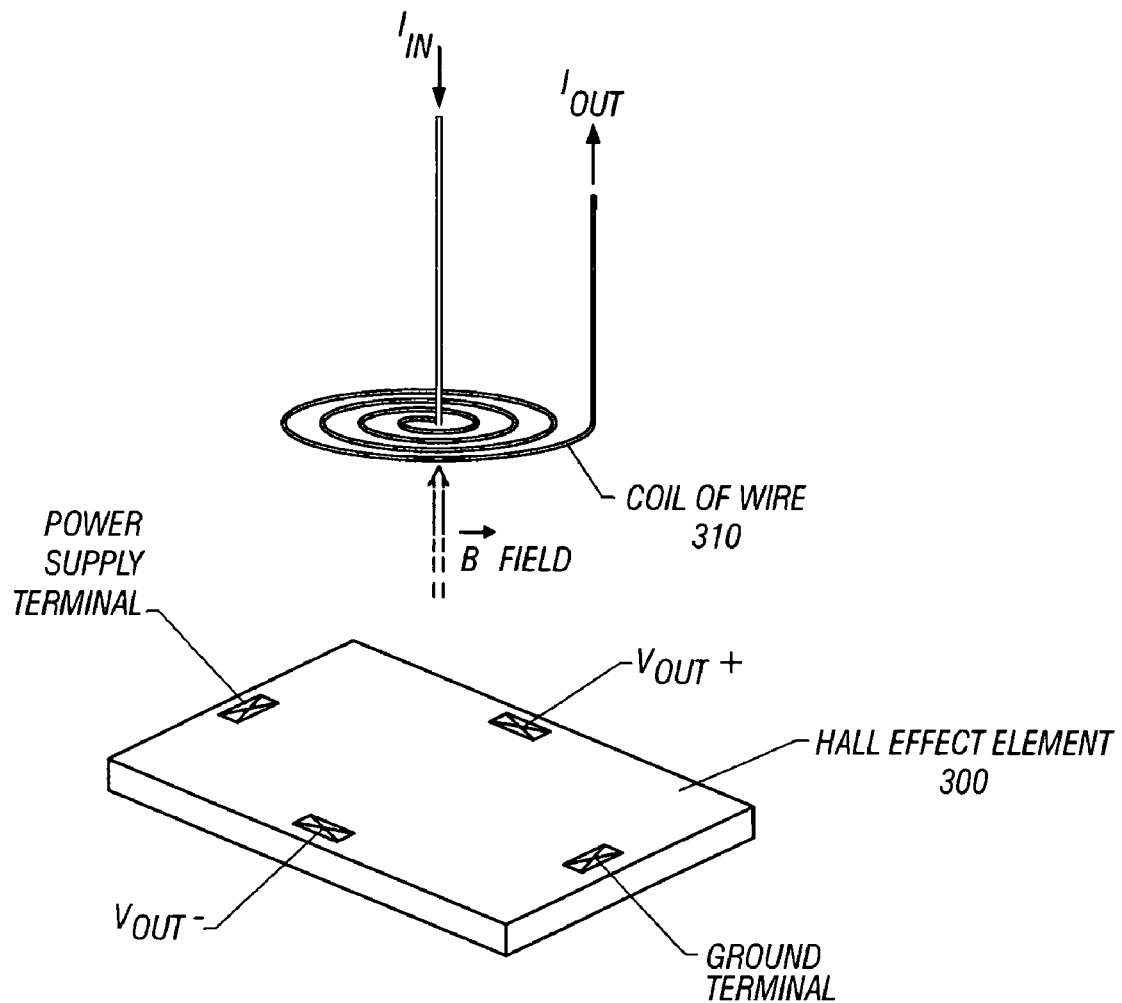
FIG. 3 is a schematic diagram showing prior art of a magnetic field generated by a coil of wire and a Hall effect element detecting the magnetic field.

Turning now to FIG. 3, a magnetic field sensor comprising a Hall effect element 300 in the prior art is depicted. The Hall effect element 300 is positioned approximately normal to, and centered about, the central axis of the coil of wire 310. The voltage isolation barrier is the shortest distance between the coil of wire 310 and the Hall effect element 300.

As an example, for an isolation barrier of a typical distance of 10,000 angstroms, the voltage breakdown of a $SiO_2$ dielectric between the Hall effect element 300 and the coil of wire 310 is approximately 1000 volts. The thickness of the isolation barrier, as well as the chemical compensation of the dielectric material, can be adjusted during the processing of the circuit in order to achieve the desired voltage isolation strength.

Generally, the current flow in the coil of wire 310, the cross section of the wire, and the Hall effect element are interrelated. For example, if the current flow is large, a large cross-sectional wire is preferred to prevent resistive heating from damaging the wire. However, in comparison to a small cross-sectional wire, a large cross-sectional wire will have a larger parasitic capacitance associated with it. A larger parasitic capacitance limits the frequency response of the coil 310. In addition, the magnetic field produced by the current flowing in the coil of wire 310 must be of sufficient magnitude to be sensed by the Hall effect sensor.

To limit the cross-sectional area of the coil of wire 310, a 10 μm width was chosen for the coil of wire 310. To limit the power required to drive the coil of wire a 10 mA drive current was chosen for the coil of wire 310. To maximize the magnetic field generated two layers of metal were chosen for the coil of wire 310. The two layers of metal are connected in series. From a geometric connectivity consideration, an even number of metal layers could be used to make the coil of wire 310.

The magnetic field produced by the coil of wire 310 was calculated with Magnetic Field calculation software commercially available and known as MAXWELL 2D, by ANSOFT. With a 10 mA current flowing through a 2-layer coil, one coil stacked on top of the other and each coil connected in series, the software calculates a magnetic field perpendicular to the Hall effect sensor surface of approximately 50 Gauss. At 25 degrees Centigrade, or approximately room temperature, given a magnetic field strength of 50 Gauss a typical CMOS Hall effect sensor will produce a 1 mV signal. This signal is on the same magnitude as the DC-offset voltage of the Hall effect sensor. Therefore, special signal processing separates the low level magnetic field induced signal from the DC-offset voltage. In sum, since the signals generated by a silicon based Hall effect sensor are very small, special care must be used to effectively utilize these low-level signals.

As mentioned above, the DC-offset term changes with variations in temperature. Furthermore, due to the temperature dependent mobility term $\mu$ of Equation 1, the magnetic field sensitivity of the Hall effect sensor will also change with temperature. For optimal performance, it is desirable to correct these temperature related effects by using signal processing circuits which amplify and filter the signal generated by the Hall effect sensor.

One technique to eliminate the problem of DC offsets is to AC couple (or band-pass filter) the signal received from the Hall effect sensor. An advantage of the AC coupling technique is that the circuitry required is simple. A disadvantage of the AC coupling technique is that it is incapable of passing low frequency or DC signals.

One technique to eliminate the temperature dependent sensitivity of Hall effect sensors is to process the signal received from the Hall effect sensor through a gain block whose temperature coefficient of gain is inversely proportional to the temperature dependent sensitivity of the Hall effect sensor. U.S. Pat. Nos. 4,833,406 and 5,055,768 describe two different techniques to achieve such a temperature dependent gain block. The disadvantage of these temperature compensation techniques is that they only address the problem of the temperature dependent sensitivity of the Hall effect sensor. These techniques in the prior art, however, fail to address the problem of DC-offsets and changes of DC-offsets with temperature.

Another technique used to improve the performance of silicon based Hall effect sensor is to use an offset and gain calibration engine to eliminate temperature dependent sensitivity of Hall effect sensors. An advantage of the offset and gain calibration engine is that it can pass low frequency signals. Another advantage of using a calibration engine is that it can be used to adjust the gain of the receive path. A disadvantage of the offset and gain calibration engine is that time is required to complete the calibration.

A second disadvantage in the prior art is that when the Hall effect sensor is being calibrated, the Hall effect sensor is essentially taken out of service and no data signal can be received during calibration. The Hall effect sensor has no "intelligence" to indicate when it is an appropriate time to take itself out of service and perform a calibration. Therefore, neither technique mentioned above is fully acceptable for all circuit applications.

There are at least three different problems that need to be addressed when using a silicon based Hall effect sensor in a voltage isolation buffer. The magnetic field sensitivity of the silicon based Hall element has a very high temperature dependence. A typical silicon based Hall effect sensor will have a sensitivity variation of 2 to 1 over a temperature span of 100 degrees Celsius. The DC offset of the Hall effect sensor is on the same order of magnitude as the desired signal being sensed by the Hall effect sensor. Furthermore, the DC offset will change with temperature and mechanical stress place upon the silicon chip.

Figure 4A:
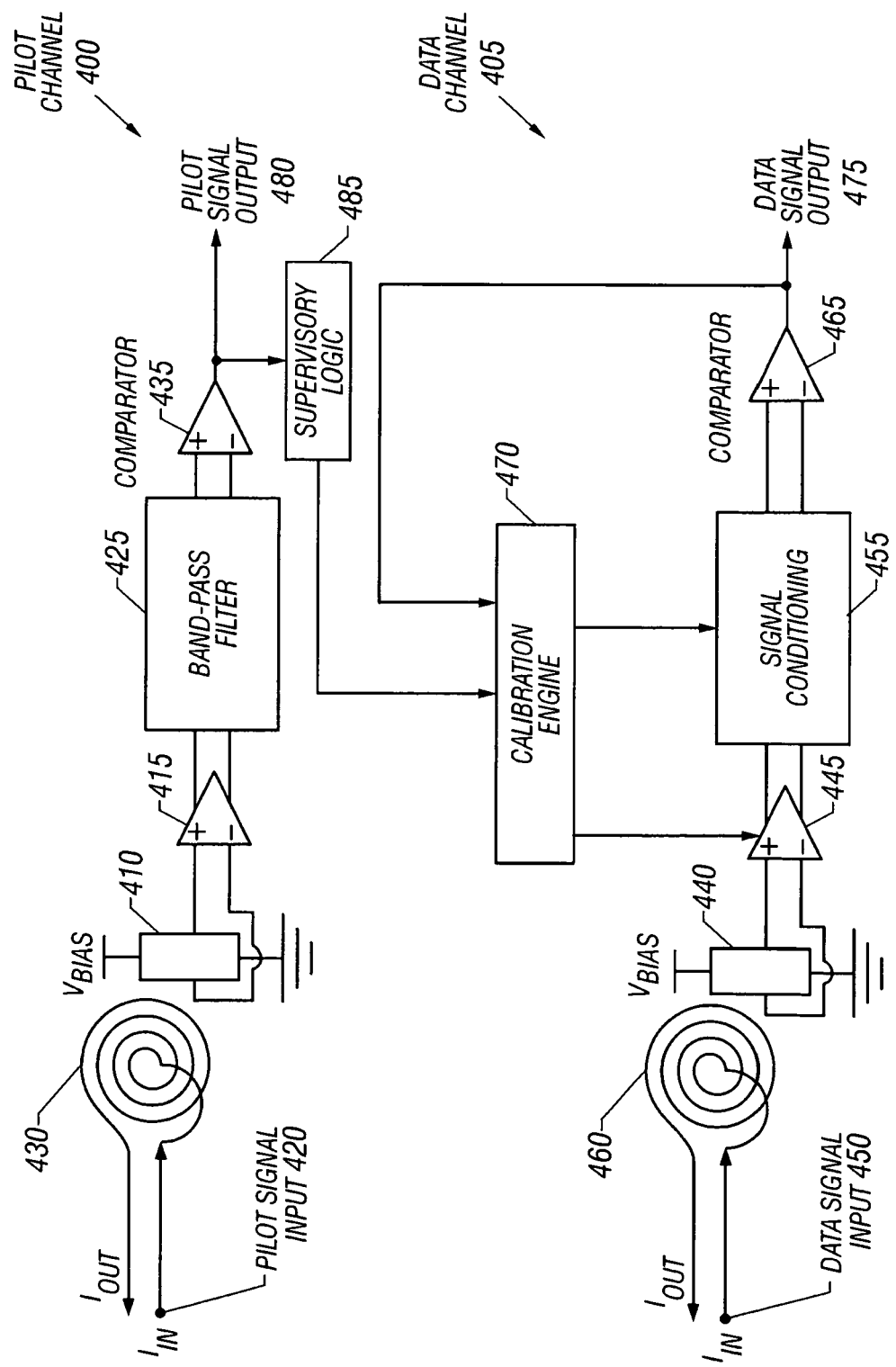
FIG. 4A is a block diagram of a single-data-channel voltage isolation buffer in accordance with the present invention.

Reference is now made to FIG. 4A, which depicts a block diagram of single-data-channel voltage isolation buffer in accordance with the present invention. An isolation buffer comprises a transmit side, comprising a signal current passed through a coil of wire, and a receive side, comprising a Hall effect sensor which senses the magnetic field generated by the current flow in the coil of wire. In order to overcome the limitations of the prior art relating to temperature dependent sensitivity of Hall effect sensors, the present invention provides an AC coupled Hall effect sensor in combination with a DC coupled Hall effect sensor. The AC coupled Hall effect sensor corresponds to the pilot channel 400, while the DC coupled Hall effect sensor corresponds to data channel 405. The pilot signal acts as a supervisory signal for the DC coupled Hall effect sensor. The data signal is the signal being translated by the voltage isolation buffer.

As shown in FIG. 4A, a pilot signal input 420 is sent through a coil of wire 430, which is placed above Hall effect element 410, thereby generating a magnetic field perpendicular to Hall effect element 410. The resulting voltage across the signal terminals of Hall effect element 410 may be amplified by amplifier 415. The voltage signal is then preferably AC coupled by band-pass filter 425. The filtered signal is then converted from an analog signal to a digital signal by comparator 435. The resulting digital signal is pilot signal output 480, which is input to supervisory logic 485. Supervisory logic 485 provides control signals to calibration engine 470.

In data channel 405, a data signal input 450 is sent through a coil of wire 460, which is placed above Hall effect element 440, thereby generating a magnetic field perpendicular to Hall effect element 440. The resulting voltage across Hall effect element 440 may be amplified by amplifier 445. The voltage is preferably DC coupled, but may be AC coupled by signal conditioning block 455. The signal is then converted from an analog signal to a digital signal by comparator 465. The resulting digital signal is data signal output 475.

Calibration engine 470 is used to enable accurate sensing of low frequency signals transmitted across the isolation barrier. The pilot signal, via the supervisory logic 485, indicates to calibration engine 470 when to calibrate the DC coupled Hall effect sensor. Exemplary instructions that the pilot signal output 480 may indicate to the calibration engine 470 include without limitation the following: start calibration; stop calibration; data is present; no data is present; and a data error has occurred.

Figure 4B:
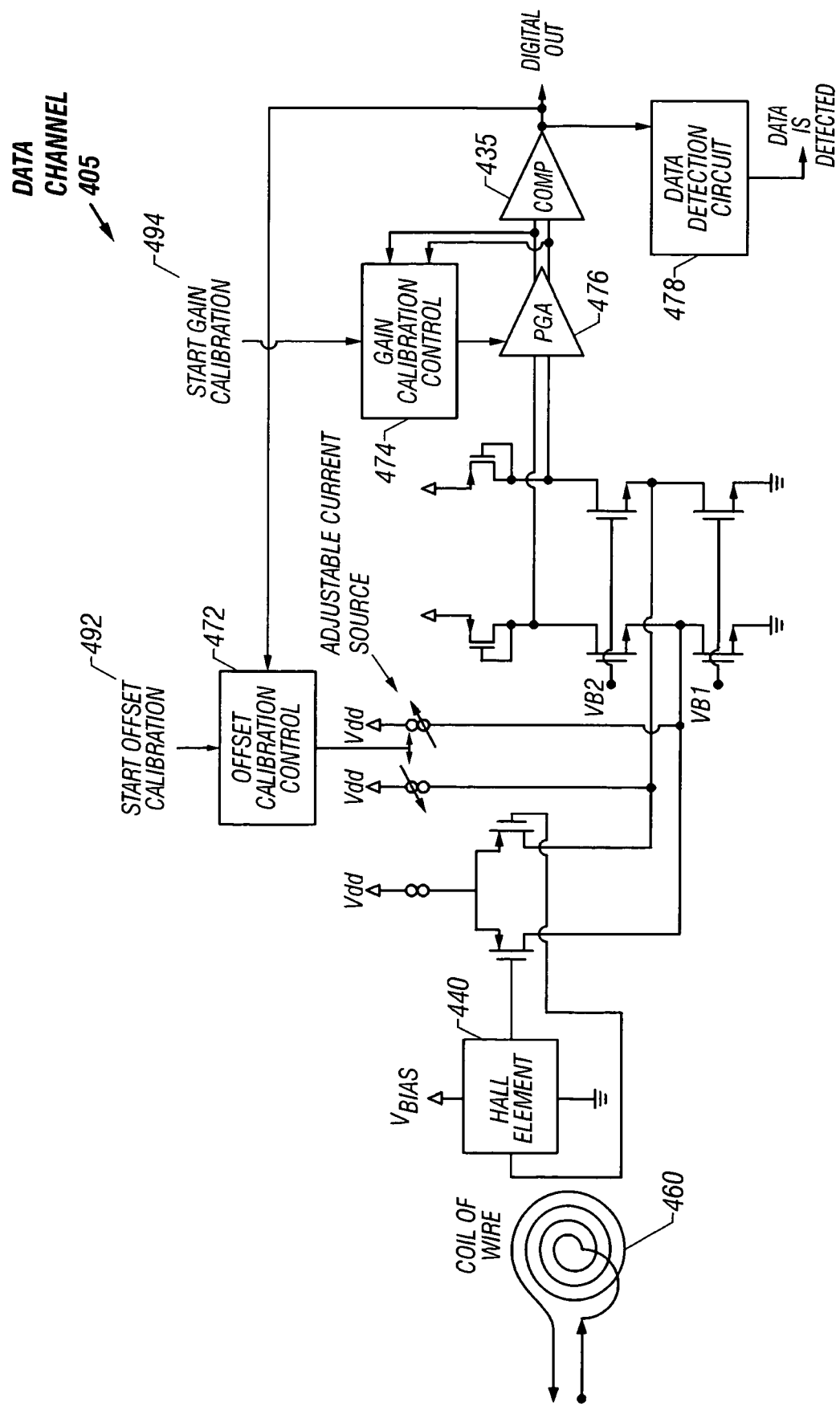
FIG. 4B is a schematic diagram of the data channel of FIG. 4A.

Reference is now made to FIG. 4B, which depicts a schematic diagram of the data channel 405 of FIG. 4A. As depicted in FIG. 4B, the calibration engine 470 of FIG. 4A comprises an offset calibration control logic 472 and a gain calibration control 474. When the pilot channel sends a signal to the data channel to start offset calibration, the offset adjust current sources change values under the control of the offset calibration engine. Furthermore, the coil of wire 460 that generates the magnetic field for the data channel receiver should be receiving a data signal, which corresponds to the "data slicing" point of the system, during the offset calibration time. The "data slicing" point is defined as the level where the comparator output transitions from a low logic level output to a high logic level output. During normal operation, any signal with a lower absolute value than the "data slicing" point will be translated as a digital zero output, while any signal with a higher absolute value than the "data slicing" point will be translated as a digital one output.

The offset calibration control 472 monitors the state of the output of comparator 435. The offset calibration control logic 472 initializes the offset adjust current sources to a minus full-scale offset adjust value. The offset calibration control logic 472 then slowly changes, in small steps, the value of the offset adjust current source from minus full-scale offset value towards a plus full-scale offset value. When the comparator 465 changes state, the calibration logic knows that the system offset has been driving to zero and calibration has been accomplished.

The gain calibration is accomplished in a similar fashion as the offset calibration. However, during gain calibration, the coil of wire 460 that generates the magnetic field for the data channel receiver should be receiving a data signal that corresponds to the maximum amplitude signal received. The gain calibration control logic 474 monitors the amplitude of the receive signal and adjusts the programmable gain amplifier (PGA) 476 until the amplitude being detected is of the desired value. This type of gain calibration not only adjusts for sensitivity variation of the Hall effect element 440, but also variations in the signal strength of the transmitter coil driver. The data detection circuit 478 is used to indicate to the pilot channel 400 that data is being received by the data channel 405.

FIG. 4C depicts a schematic diagram of the pilot channel 400 of FIG. 4A. The pilot signal output 480 drives supervisory logic 485 for the data channel 405. The supervisory logic 485 monitors the data being received by the pilot channel 400. The supervisory logic 484 then controls the start offset calibration control signal 492 and the start gain calibration control signal 494.

Figure 5:
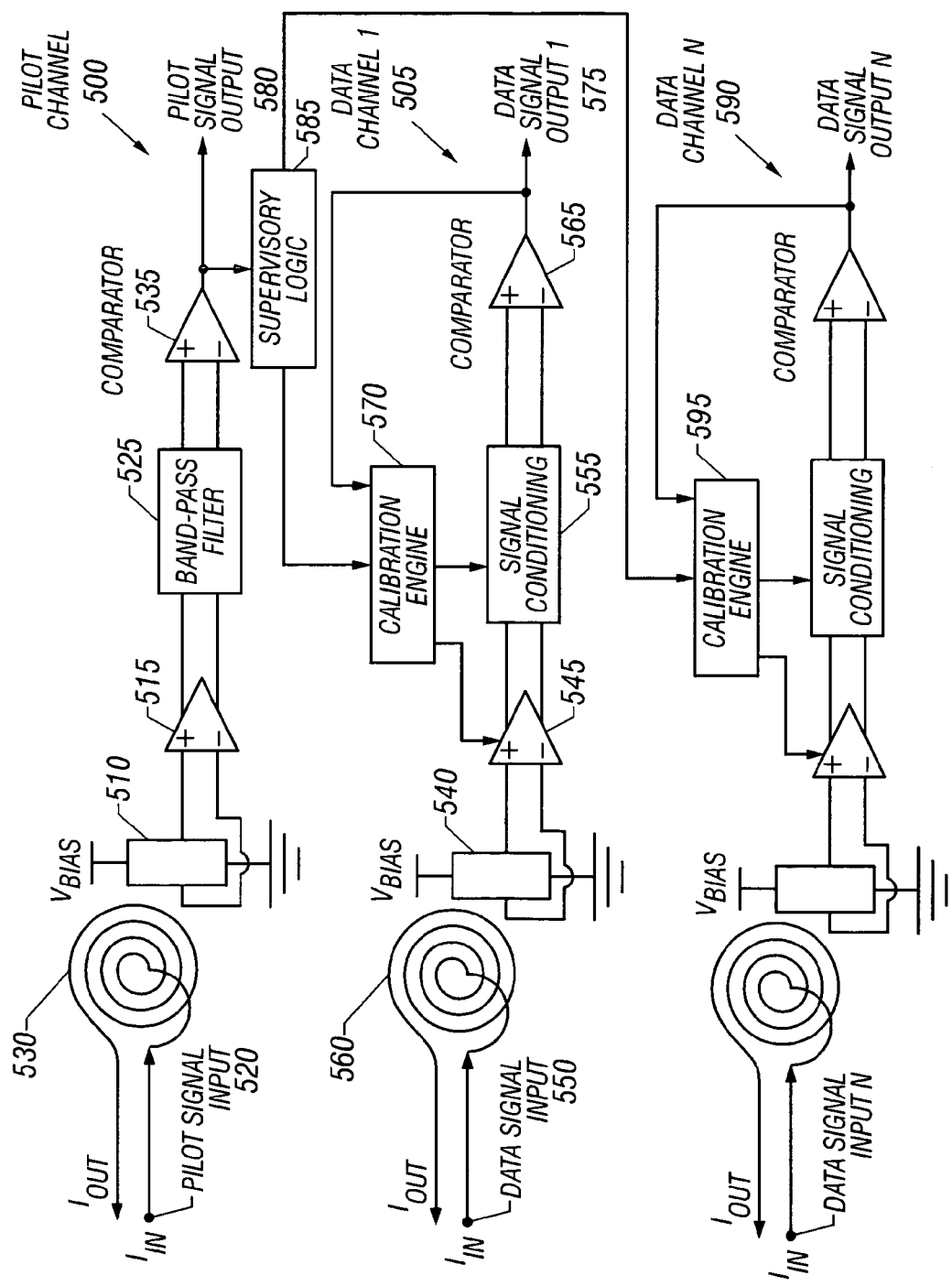
FIG. 5 is a block diagram of a multi-data-channel voltage isolation buffer in accordance with the present invention

Reference is now made to FIG. 5, which depicts a block diagram of a multi-data-channel voltage isolation buffer in accordance with one embodiment of the present invention. As shown in FIG. 5, the voltage isolation buffer comprises a pilot channel 500 and N multiple data channels 505 and 590. A pilot signal input 520 is sent through a coil of wire 530, which is placed above Hall effect element 510, thereby generating a magnetic field perpendicular to Hall effect element 510. The resulting voltage across the signal terminals of Hall effect element 510 may be amplified by amplifier 515. The voltage signal is then preferably AC coupled by band-pass filter 525. The filtered signal is then converted from an analog signal to a digital signal by comparator 535. The resulting digital signal is pilot signal output 580, which is input to supervisory logic 585. Supervisory logic 585 provides control signals to each data channel calibration engine shown as elements 570 and 595.

In data channel 505, a data signal input 550 is sent through a coil of wire 560, which is placed above Hall effect element 540, thereby generating a magnetic field perpendicular to Hall effect element 540. The resulting voltage across the signal terminals of Hall effect element 540 may be amplified by amplifier 545. The voltage is preferably DC coupled, but may be AC coupled by signal conditioning block 555. The signal is then converted from an analog signal to a digital signal by comparator 565. The resulting digital signal is data signal output 575. Data channel 590 operates in a similar fashion. Although FIG. 5 depicts two separate calibration engines 570 and 595 for data channel 505 and data channel 590, respectively, components that are common to the calibration engines 570 and 595 may be combined into a single calibration engine 570 and shared by data channel 505 and data channel 590.

Figure 6:
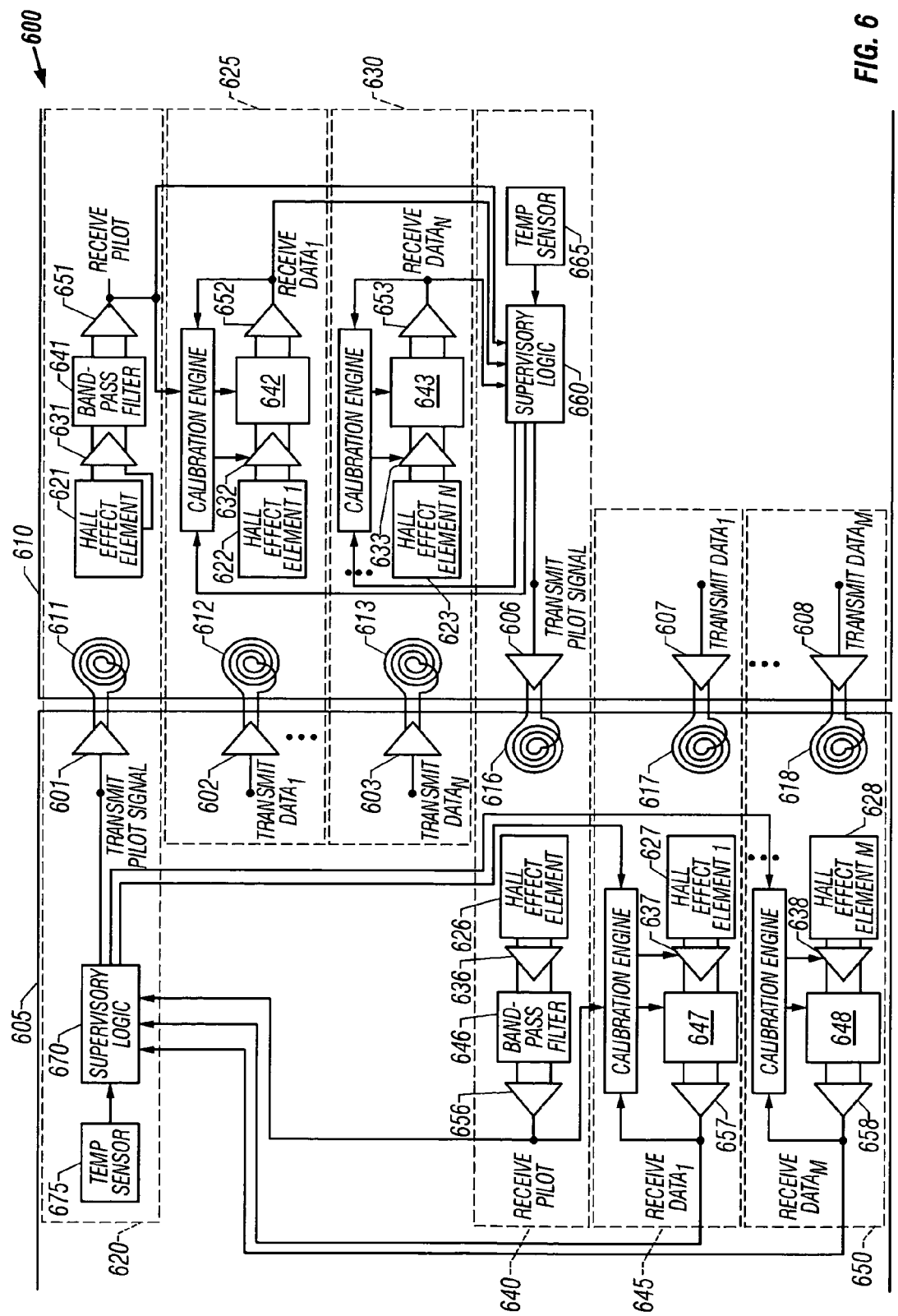
FIG. 6 is a block diagram of a bi-directional, multi-data-channel voltage isolation buffer in accordance with the present invention.

Reference is now made to FIG. 6, which depicts a block diagram of a bi-directional, multi-data-channel voltage isolation buffer 600 in accordance with one embodiment of the present invention. FIG. 6 depicts two separate integrated circuits 605 and 610, which are preferably silicon-based circuits.

As shown in FIG. 6, voltage isolation buffer 600 comprises pilot channel 620, data channels 625 and 630, pilot channel 640, and data channels 645 and 650. M additional data channels 645 and 650 may be used in connection with one pilot channel 640, without the necessity of adding additional pilot channels. Furthermore, N additional data channels 625 and 630 may be used in connection with one pilot channel 620, without the necessity of adding additional pilot channels. One of ordinary skill in the art will appreciate that M need not equal N. Furthermore, M and N can be one.

Current source 601 is coupled to integrated circuit 605, and drives current through coil 611. Current source 602 is coupled to integrated circuit 605, and drives current through coil 612. Current source 603 is coupled to integrated circuit 605, and drives current through coil 613. Current source 606 is coupled to integrated circuit 610, and drives current through coil 616. Current source 607 is coupled to integrated circuit 610, and drives current through coil 617. Current source 608 is coupled to integrated circuit 610, and drives current through coil 618.

Coil 611 is located above Hall effect element 621. The current through coil 611 generates a magnetic field perpendicular to Hall effect element 621. The resulting output signal of Hall effect element 621 may be passed through an amplifier 631, and the amplified signal is AC coupled by band-pass filter 641. The filtered signal may be converted from an analog signal to a digital signal by comparator 651. The digital signal from comparator 651 is the digital output of the pilot channel 620, and provides a control signal for supervisory logic 660.

The current through coil 612 generates a magnetic field perpendicular to Hall effect element 622. The resulting output signal of Hall effect element 622 may be passed through an amplifier 632, and the amplified signal may be DC coupled by signal conditioning block 642. The filtered signal may be then converted from an analog signal to a digital signal by comparator 652. The digital signal from comparator 652 is the digital output of the data channel, element 625, and may provide a feedback signal for supervisory logic 660.

The current through coil 613 generates a magnetic field perpendicular to Hall effect element 623. The resulting output signal of Hall effect element 623 may be passed through an amplifier 633, and the amplified signal may be DC coupled by signal conditioning block 643. The filtered signal may be then converted from an analog signal to a digital signal by comparator 653. The digital signal from comparator 653 is the digital output of the data channel, element 630, and may provide a feedback signal for supervisory logic 660.

The current through coil 616 generates a magnetic field perpendicular to Hall effect element 626. The resulting output signal of Hall effect element 626 may be passed through an amplifier 636, and the amplified signal is AC coupled by band-pass filter 646. The filtered signal may be converted from an analog signal to a digital signal by comparator 656. The digital signal from comparator 656 is the digital output of the pilot channel, element 640, and provides a control signal for supervisory logic 670.

The current through coil 617 generates a magnetic field perpendicular to Hall effect element 627. The resulting output signal of Hall effect element 627 may be passed through an amplifier 637, and the amplified signal may be DC coupled by signal conditioning block 647. The filtered signal may be then converted from an analog signal to a digital signal by comparator 657. The digital signal from comparator 657 is the digital output of the data channel, element 645, and may provide a feedback signal for supervisory logic 670.

The current through coil 618 generates a magnetic field perpendicular to Hall effect element 628. The resulting output signal of Hall effect element 628 may be passed through an amplifier 638, and the amplified signal may be DC coupled by signal conditioning block 648. The filtered signal may be then converted from an analog signal to a digital signal by comparator 658. The digital signal from comparator 658 is the digital output of the data channel, element 650, and may provide a feedback signal for supervisory logic 670.

One advantage of the bi-directional voltage isolation buffer 600 is that each integrated circuit or chip preferably includes a temperature sensor (665 and 675, respectively) for sensing the occurrence of a temperature shift. The chip that senses a large temperature shift can then issues control commands on the pilot signal, such as a request for calibration. Once a request for calibration has occurred, a high level protocol can then be implemented to gracefully handle the interruption of data on the DC coupled Hall effect sensor during a calibration cycle.

Another advantage of the bi-directional isolation buffer 600 is that the channel transmitting data can indicate on the transmitted pilot signal that data is being transmitted. The receive side of the voltage isolation buffer 600 can have appropriate circuitry to indicate that data is being detected by the DC coupled Hall effect sensor. If the receive channel "data detection" circuitry is not detecting the presence of data, but the receive channel pilot signal is indicating that data should be present, then an error condition can be transmitted back across the barrier on the pilot signal indicating that a data error has occurred and that a calibration cycle needs to occur. In a bi-directional system, the supervisory logic can also generate a signal to be transmitted back across the isolation barrier as to what state the receive data channel is in. (i.e., whether the receive channel is receiving data or in a calibration mode.) The bi-directional system yields a more intelligent system in that one side of the isolation barrier can communicate to the other side of the isolation barrier the status of the respective data channels.

For a single-data-channel voltage isolation barrier as shown in FIG. 4A, two coils and two Hall effect elements per chip are utilized—one sensor-coil pair for the pilot signal, and a second sensor-coil pair for the data signal. In a multiple-data-channel voltage isolation barrier as shown in FIG. 5, each data signal utilizes a separate coil and a separate Hall effect element, while only one pilot signal per chip is required. The pilot channel, which utilizes a single coil and a single Hall effect element, controls the multiple calibration engines of the DC coupled Hall effect element.

The preceding examples are included to demonstrate specific embodiments of the invention. It should be appreciated by those of skill in the art that the techniques disclosed in the examples which follow represent techniques discovered by the inventor to function well in the practice of the invention, and thus can be considered to constitute preferred modes for its practice. However, it should be understood that the invention is not intended to be limited to the particular forms disclosed. Rather, the different aspects of the disclosed compositions and methods may be utilized in various combinations and/or independently. Thus the invention is not limited to only those combinations shown herein, but rather may include other combinations. Further, those of skill in the art should, in light of the present disclosure, appreciate that many changes can be made in the specific embodiments which are disclosed and still obtain a like or similar result without departing from the spirit and scope of the invention.

What is claimed is:

1. A voltage isolation buffer comprising:
    an AC coupled Hall effect sensor;
    a plurality of DC coupled Hall effect sensors; and
    a means for calibration;
    wherein the AC coupled Hall effect sensor is operatively coupled to the means for calibration; and
    wherein each of the plurality of DC coupled Hall effect sensors is operatively coupled to the means for calibration.

2. A system for transmitting data across a voltage isolation barrier via a magnetic field, the system comprising:
    a first pilot channel comprising an AC coupled Hall effect sensor; and
    a plurality of data channels, wherein each of the plurality of data channels comprises a DC coupled Hall effect sensor, and wherein each of the plurality of data channels further comprises a means for calibration operatively coupled to the AC coupled Hall effect sensor;
    wherein the means for calibration is operatively coupled to each DC coupled Hall effect sensor;
    wherein the means for calibration is configurable to receive information from the AC coupled Hall effect sensor; and
    wherein the means for calibration is configurable to calibrate each DC coupled Hall effect sensor based on the information from the AC coupled Hall effect sensor.

3. A bi-directional voltage isolation buffer comprising:
    a first integrated circuit; and
    a second integrated circuit adjacent to the first integrated circuit;
    wherein the first integrated circuit comprises a first AC coupled Hall effect sensor operable to receive a pilot signal from the second integrated circuit;
    wherein the first integrated circuit comprises a first DC coupled Hall effect sensor operable to receive a control signal from the first AC coupled Hall effect sensor;
    wherein the second integrated circuit comprises a second AC coupled Hall effect sensor operable to receive a pilot signal from the first integrated circuit; and
    wherein the second integrated circuit comprises a second DC coupled Hall effect sensor operable to receive a control signal from the second AC coupled Hall effect sensor.

4. The bi-directional voltage isolation buffer of claim 3, wherein the first integrated circuit comprises a means for calibration operatively coupled to the first AC coupled Hall effect sensor.

5. The bi-directional voltage isolation buffer of claim 4, wherein the means for calibration is configurable to calibrate the first DC coupled Hall effect sensor based on information from the first AC coupled Hall effect sensor.

6. The bi-directional voltage isolation buffer of claim 3, wherein the second integrated circuit comprises a means for calibration operatively coupled to the second AC coupled Hall effect sensor.

7. The bi-directional voltage isolation buffer of claim 6, wherein the means for calibration is configurable to calibrate the second DC coupled Hall effect sensor based on information from the second AC coupled Hall effect sensor.

8. The bi-directional voltage isolation buffer of claim 3, wherein the first integrated circuit comprises a third DC coupled Hall effect sensor operable to receive a control signal from the first AC coupled Hall effect sensor.

9. The bi-directional voltage isolation buffer of claim 3, wherein the second integrated circuit comprises a third DC coupled Hall effect sensor operable to receive a control signal from the second AC coupled Hall effect sensor.

10. The bi-directional voltage isolation buffer of claim 3, wherein the first DC coupled Hall effect sensor is operable to receive a data signal from the second integrated circuit.

11. The bi-directional voltage isolation buffer of claim 3, wherein the first DC coupled Hall effect sensor is operable to receive a data signal from the first integrated circuit.

* * * * *